United States Patent [19]

Ingelstrom

[11] Patent Number: 4,943,543

[45] Date of Patent: Jul. 24, 1990

[54] SINTERED CERAMIC MATERIALS

[75] Inventor: Nils A. Ingelstrom, Bromma, Sweden

[73] Assignee: Sandvik Aktiebolag, Sandviken, Sweden

[21] Appl. No.: 281,916

[22] Filed: Dec. 7, 1988

Related U.S. Application Data

[63] Continuation of Ser. No. 44,336, Apr. 30, 1987, abandoned.

[51] Int. Cl.$^5$ .................... C04B 35/58; C04B 35/10; C04B 35/14
[52] U.S. Cl. ........................................ 501/96; 501/97; 501/98; 501/127; 501/128; 501/133; 501/153; 501/154
[58] Field of Search ............ 501/96, 97, 98, 127, 501/128, 133, 153, 154; 51/309

[56] References Cited

U.S. PATENT DOCUMENTS

| | | | |
|---|---|---|---|
| 4,113,503 | 9/1978 | Lumby et al. | 501/98 |
| 4,127,416 | 11/1978 | Lumby et al. | 501/98 |
| 4,243,621 | 1/1981 | Mori et al. | 264/65 |
| 4,285,895 | 8/1981 | Mangels et al. | 501/98 |
| 4,388,085 | 6/1983 | Sarin et al. | 501/97 |
| 4,424,066 | 1/1984 | Sarin et al. | 51/295 |
| 4,426,209 | 1/1984 | Sarin et al. | 51/295 |
| 4,506,020 | 3/1985 | Butler et al. | 501/97 |
| 4,543,345 | 9/1985 | Wei | 501/95 |
| 4,547,470 | 10/1985 | Tanase et al. | 501/87 |
| 4,563,433 | 1/1986 | Yeckley et al. | 501/97 |
| 4,640,903 | 2/1987 | Matsuhiro et al. | 501/97 |

FOREIGN PATENT DOCUMENTS

| | | |
|---|---|---|
| 106817 | of 0000 | European Pat. Off. . |
| 0082371 | 6/1983 | European Pat. Off. . |
| 1464022 | of 0000 | United Kingdom . |
| 2118927 | of 0000 | United Kingdom . |
| 2157282 | 10/1985 | United Kingdom ............ 501/98 |

OTHER PUBLICATIONS

"α'-Sialon Ceramics", Nature, vol. 274, No. 10, pp. 251-256. Park H. K., Thompson D. P. and Jack K. H., α-Sialon Ceramics, Science of Ceramics, vol. 10.
Bhattacharyya S. K., Jawaid A., Lewis M. H. & Wallbank J.; "Wear Mechanisms of Syalon Ceramic Tools When Maching Nickel-Based Materials", Metal Technology, Dec. 1983, vol. 10.

Primary Examiner—William R. Dixon, Jr.
Assistant Examiner—Anthony J. Green
Attorney, Agent, or Firm—Burns, Doane, Swecker & Mathis

[57] ABSTRACT

This invention relates to sintered ceramic materials in which the densification during sintering takes place with a liquid phase preferably based on silicon nitride. During sintering such materials are often embedded in a powder of inert material such as BN, etc. The invention resides in the fact that by embedding the material to be sintered in a protective powder with a composition similar to that of the intergranular phase, a surface zone with a composition and/or structure different from that of the core can be obtained.

16 Claims, No Drawings

SINTERED CERAMIC MATERIALS

This application is a continuation of application Ser. No. 044,336, filed on Apr. 30, 1987, abandoned.

BACKGROUND OF THE INVENTION

This invention relates to a compound ceramic material, preferably based on silicon nitride, useful for cutting tools and structural components where the wear resistance and toughness behaviour is important.

Silicon nitride ceramics have many interesting features which have made them extremely suitable for certain wear part applications and as cutting tools. Intrinsic properties such as low thermal expansion, relatively high thermal conductivity and high elastic modulus give the material excellent resistance against thermal shocks and, thus, good toughness behaviour.

However, it is difficult to sinter silicon nitride ceramics to full density without using sintering aids. Such sintering aids include magnesia, alumina, beryllia, zirconia and the rare earth oxides including yttria. Also the related nitrides, oxynitrides or silicates may be used as sintering aids. By applying standard sintering techniques, Si—Al—O—N ceramics may be formed in which Al and O have been substituted from some Si and N atoms in the crystal lattice. The chemical formula for this material may be written $Si_{6-z}Al_zO_zN_{8-z}$ (where $0 < z < 4.2$). This beta-sialon phase has the same crystal structure as beta—$Si_3N_4$.

Another sialon phase, for instance, alpha sialon stabilized by yttria, is $M_x(Si,Al)_{12}(O,N)_{16}$, where M=yttrium or other atoms with a suitable atom radius and x is typically between 0 and 2.

By using hot pressing, HIP sintering or similar sintering methods, dense Si—Al—O—N ceramics will be formed in which the silicon nitride is essentially alumina free (or with very low alumina substitution).

The added sintering aids form an intergranular phase during the sintering. The amount is typically 5-20 vol-%. This phase can be amorphous or partly or fully crystalline depending on sintering conditions, composition, etc.

During sintering, the ceramic material is often embedded in a protective powder bed with inert material such as BN or $Si_3N_4$ or mixtures of these materials with $SiO_2$ or other metal oxides. It is important to avoid excessive degradation of the ceramic material by formation of gaseous compounds such as SiO and $N_2$. The powder provides a protective embedment and a local atmosphere with sufficiently high counterpressure of SiO and $N_2$. This could be done on the microscale (powder surrounding each compact) or on macroscale (the powder or the powder compacts are used as a gas generator to produce the necessary counterpressure for the whole sintering system). Essentially no solid state reactions take place between the ceramic compacts and the protective powder, only gas reactions.

SUMMARY OF AND DETAILED DESCRIPTION OF THE INVENTION

However, it has surprisingly been found that if the protective powder has a similar composition as the intergranular phase of the sintered compacts, rapid, probably diffusion controlled, reactions take place in the surface zone of the ceramic bodies during the sintering. This makes it possible to obtain dense ceramic materials with one composition in the outer part and another composition in the core and with a gradual change in composition and/or structure because the densification is favoured by a rapid liquid phase sintering. The thickness of the surface transition zone is generally more than 50 $\mu$m, preferably more than 100 $\mu$m. In addition, the obtained ceramic materials comprise a gradual change in composition and thus in properties from the transition zone towards the core. The thickness of the surface zone is generally more than 100 $\mu$m, preferably more than 500 $\mu$m and most preferably 0.8-2 mm. The density of the ceramic body is generally more than 98%, preferably more than 99%, of the theoretical density. The grain size is in most cases below 15 $\mu$m. If too high sintering temperatures are used the surface zone will be too wide and almost no difference in composition and structure between core and surface zone will be obtained. By using the method of the invention, ceramic materials can be made in which, for instance, the surface zone can comprise beta-sialon ceramic material having high toughness but moderate hot hardness, while the core comprises ceramics containing mixtures of alpha and beta sialon phases which exhibit much improved hot hardness but somewhat lower toughness behaviour. Such materials will be obtained by using a protective powder with an active part comprising more than 40% $Si_3N_4$, more than 10% $SiO_2$ and more than 10% $Al_2O_3$ which has a relatively high $SiO_2$ activity. By using a more nitrogen rich surrounding during sintering or post treatment e.g. by using AlN, YN or similar nitrides, alpha-beta sialon structures can be formed in the surface zone of the ceramic material while the overall composition is such that a beta sialon structure is formed in the centre. In order to be effective more than 10% AlN and/or YN is preferred to be used in the active part of the protective powder.

Also other phrases such as the Si—Al—O—N polytypes may be formed as well as other phases in the $Si_2N_4$—AlN—$Al_2O_3$—$SiO_2$+MeO (Me=metal) system.

In addition, the sintering can be performed at higher nitrogen pressures than 1 atm, e.g. at 15-30 atm, or very high pressures of 1000-2000 atm or more. Using elevated nitrogen pressures, it is possible to use smaller additions of sintering aids and still obtain dense ceramic materials according to the invention with densities of 98% of the theoretical or more. It is also possible to use other gases than nitrogen, e.g., argon or other inert gases or hydrogen or hydrocarbons. However, nitrogen or gas mixtures containing nitrogen are preferred. The intergranular phase is generally more than 0.5 vol-%, preferably more than 1 vol-%.

It is also possible to obtain $Si_3N_4$-materials with different compositions in core and surface zone by applying, before the sintering, one or more layers with different compositions on the green body. Such layers could be applied by spraying or painting techniques as well as other established techniques such as CVD, PVD etc.

This new technique opens up the possibility of producing compound materials with different properties in the core and outer parts also for other systems. The essential thing is that the densification takes place with the help of a liquid phase and that it is possible to change the properties of the material by changing the composition of the liquid phase. By using the sintering technique or post heat treatment according to the invention, ceramic materials can be tailored to meet different specific demands.

The invention can be applied to many ceramic systems such as sialon, $Si_3N_4$ or AlN with minor or larger amounts of sintering aids, with or without refractory compounds such as TiN, WC or similar compounds. The invention can also be applied to alumina based ceramic systems. It can also be used to fiber or whisker reinforced ceramics in which the diameter of the whiskers is less than 5 $\mu$m and the aspect ratio (length/diameter ratio) >10 or in systems in which a metallic binder is used, systems such as a metal-ceramics or metal-glass-ceramics, etc.

Another important advantage with the invention resides in the fact that ceramic materials of different coefficients of thermal expansion can be formed in which the resulting stress system is such that the toughness behaviour is increased. In addition, by using ceramic materials according to the invention, excellent substrate materials can be made for CVD or PVD coatings due to the possibility of gradual change of the expansion behaviour from that of the substrate to that of the coating.

It is also very beneficial to use the invention with transformation toughened ceramic systems and, e.g. in systems where the outer part has such a composition that a phase transformation can take place with a subsequent change in volume and development of compressive forces. This would be very favorable for most ceramic materials, especially to those inclined to slow crack growth.

The invention is additionally illustrated in connection with the following Examples which are to be considered as illustrative of the present invention. It should be understood, however, that the invention is not limited to the specific details of the Examples.

EXAMPLE (1)
(Comparative)

An alpha-beta sialon ceramic material was made by mixing 81.8 g $Si_3N_4$, 2.5 g $Al_2O_3$, 6.1 g $Y_2O_3$ and 9.6 g AlN in 1000 ml propanol together with a lubricant and milling for 20 hours with alumina milling media. After drying and granulation, the material was sintered between 1780°-1800° C. for 2 hrs according to standard procedures, embedded in BN. A sialon material was obtained which had the same structure in the core and in the outer parts.

The so obtained reference material (Ref 1) had the following crystalline phase composition (the amount of the crystalline phases is taken as the relative peak height of the x-ray diagram for the respective phase):

| | |
|---|---|
| beta-sialon, (z = 0.75) | 59% |
| alpha-sialon | 30% |
| b-phase | 9% |
| 12H(polytype) | 1% |
| Hardness = 1550 HV10 | |
| Hot hardness, 1000° C. = 1050 HV | |
| Toughness (K-idt) = 4.2 MN m$^{-1.5}$ | |

EXAMPLE 2
(Comparative)

Another sialon ceramic material was made by adding 88.2 g $Si_3N_4$, 6.0 g $Al_2O_3$ and 5.8 g $Y_2O_3$ and following the same manufacturing procedure as described above. The obtained beta-sialon material had the following crystalline phase composition:

| | |
|---|---|
| beta-sialon (z = 0.24) | 100% |
| Hardness = 1350 HV 10 | |
| Hot hardness, 1000° C. = 550 HV | |
| Toughness (K-idt) = 5.6 MN m$^{-1.5}$ | |

This is reference material 2 (Ref 2).

EXAMPLE 3

The material of Example 1 was sintered in a powder bed comprising a mixture of 14 g $SiO_2$, 17 g $Al_2O_3$, 45 g $Si_3N_4$, 27 g $Y_2O_3$ and 30 g BN. A sialon material was obtained which comprises a core with a composition according to Ref 1 but with an about 1 mm thick surface zone close in composition to Ref 2.

In a cutting operation inserts made from this compound material were tested with the following conditions:

Workpiece material: Inconel 718
Insert style: RCGX, 120800 E
Speed: 200 m/min
Feed: 0.20 mm/rev
D.O.C. (depth of cut): 2.0 mm

| Result: |
|---|
| Tool life (any of flank wear >0.5 mm, D.O.C. notch wear >2 mm or fracture) in minutes: |

| | |
|---|---|
| Material A(this Example) | 2.8 |
| Ref 1 | 1.8 |
| Ref 2 | 2.0 |

EXAMPLE 4

An alpha-beta sialon material was made according to Example 1, but with reduced amount of AlN (3.5 g instead of 9.6 g). When this material was sintered in the same powder mixture as in Example 3 in $N_2/H_2$ (4:1) for 2 hours, a compound material with the following properties was obtained:

| Core | Surface zone |
|---|---|
| beta-sialon (z = 0.53) 93% | beta-sialon (z = 0.20) 98% |
| alpha-sialon 7% | Si 2% |
| Hardness = 1450 HV10 | Hardness = 1320 HV10 |
| Hot hardness, 1000° C. = 850 HV | Hot hardness, 1000° C. = 580 HV |
| Toughness (K-idt) = = 5.3 MN m$^{1.5}$ | Toughness (K-idt) = = 5.4 MN m$^{-1.5}$ |
| | Thickness = 1.5 mm |

The material was tested in a cutting operation with the following conditions:
Workpiece material: Inconel 718
Insert style: SNGN 120416 E
Speed: 180 m/min
Feed: 0.15 mm/rev
D.O.C.: 1.5 mm

| Result |
|---|
| Tool life (criteria as Example 3), minutes |

| | |
|---|---|
| Material B(this Example) | 3.6 |
| Ref 1 | 2.7 |
| Ref 2 | 2.0 |

In another cutting test, the following conditions were used:

Workpiece material: Incoloy 901
Insert style: SNGN 120416 E
Speed: 280 m/min
Feed: 0.15 mm/rev
D.O.C.: 2.0 mm

| Result: Tool life (criteria as Example 3), minutes | |
|---|---|
| Material B(this Example) | 3.3 |
| Ref 1 | 3.1 |
| Ref 2 | 0.2 |

EXAMPLE 5

A powder was prepared by mixing 99 g $Si_3N_4$ and 1 g $Y_2O_3$ with a lubricant and milling 12 h in a vibromill with alumina milling media. After compaction of blanks (by die-pressing) and dewaxing the samples were hot pressed (encapsulated HIP) at 1740° C. and 150 MPa for 1 h. By having the samples coated by a mixture of 80% of $Si_3N_4$, 10% $SiO_2$ and 10% $Al_2O_3$ and with minor amounts of silicon and BN (1:1) during the hot pressing, $Si_2N_2O$ was formed in the surface of the samples. A material with the following properties was formed:

| Core | Surface zone |
|---|---|
| beta-$Si_3N_4$ (z = 0) 100% | beta-$Si_3N_4$, (z = 0) 90% $Si_2N_2O$ 10% |
| Hardness = 1320 HV10 | Hardness = 1420 HV10 |
| Toughness (K-idt) = 5.4 MN $m^{-1.5}$ | Toughness (K-idt) = 4.3 MN $m^{-1.5}$ |
| | Thickness = about 2 mm |

In a cutting operation in grey cast iron with sand inclusions from the casting, the following conditions were used:
Speed=700 m/min
Feed=0.2 mm/rev
D.O.C.=2.0 mm
Tool life (flank wear > 1 mm or fracture) in minutes

| | Cutting 1 | Cutting 2 |
|---|---|---|
| Material C(this Example) | 12 | 9.4 |
| Material CC(prior art) | 9.3 | 8.2 |
| Ref 1 | 4.2 | 3.8 |
| Ref 2 | 3.6 | 3.4 |

Cutting 1 is a longitudinal cutting operation and cutting 2 is an intermittent facing operation (holes and slits were machined in the workpiece). Material CC was a hot pressed material with the same phase composition as in the core of material C (prior art).

EXAMPLE 6

A powder was prepared by mixing 82 g $Si_3N_4$, 2.1 g $Al_2O_3$, 6.0 g $Y_2O_3$ and 6.7 g AlN. After milling, drying, granulation, compaction, dewaxing and sintering, sialon pieces were obtained. The sintering was performed in a powder bed comprising a mixture of 11 g $SiO_2$, 15 g $Al_2O_3$, 50 g $Si_3N_4$, 24 g $Y_2O_3$ and 30 g BN.

A material with the following crystalline phase composition was obtained:

| Core | | Surface zone | |
|---|---|---|---|
| beta-sialon (z = 0.65) | 77% | beta-sialon (z = 0.25) | 100% |
| alpha-sialon | 10% | | |
| b-phase | 12% | | |
| Si | 1% | | |
| Hardness = 1490 HV10 | | Hardness = 1350 HV10 | |
| Hot hardness, 1000° C. = 910 HV | | Hot hardness, 1000° C. = 870 HV | |
| Toughness (K-idt) = 5.0 MN $m^{-1.5}$ | | Toughness (K-idt) = 5.6 MN $m^{-1.5}$ | |
| | | Thickness = about 1 mm | |

In a turning operation in grey cast iron with inserts SNGN 120816T, the following conditions were used:
speed=500 m/min
Feed=0.35 mm/rev
D.O.C.=2.0 mm

| Result Tool life (flank wear >2 mm) in minutes: | |
|---|---|
| Material D(this Example) | 10.8 |
| Ref. 2 | 6.2 |

EXAMPLE 7

A material was made as in Example 5, but with the addition of 30 g SiC-whiskers to the $Si_3N_4$-$Y_2O_3$ powder. The powder was hot pressed and treated in the same manner as in Example 5. A material with the following properties was obtained (the peaks from SiC have been excluded):

| Core | Surface zone | |
|---|---|---|
| beta-sialon (z = 0.03) 100% | beta-sialon (z = 0.06) | 92% |
| | $Si_2N_2O$ | 8% |
| Hardness = 1480 HV10 | Hardness = 1510 HV10 | |
| Toughness (K-idt) = 5.8 MN $m^{-1.5}$ | Toughness (K-idt) = 4.8 MN $m^{-1.5}$ | |
| | Thickness = about 1 mm | |

In a cutting operation in Meehanite cast iron, the following conditions were used:
Speed=700 m/min
Feed=0.25 mm
D.O.C.=2.0 mm

| Result Tool life (flank wear >1 mm or fracture) in minutes: | |
|---|---|
| Material E (this Example) | 17.2 |
| Material EE (prior art) | 15.2 |
| Material CC (prior art) | 7.1 |

Material EE is a hot pressed material according to prior art with the same structure as the core of material E.

EXAMPLE 8

In a blasting experiment using alumina sand (Alodur) the following removal rates, in $mm^3$/hour, were obtained. The impact velocity was about 150 m/s.

| | Removal rates, $mm^3$/hr Incidence angle | |
|---|---|---|
| | 45° | 90° |
| Ref 2 | 21.4 | 13.0 |
| Material according to the | 3.6 | 2.0 |

|  | Removal rates, mm³/hr Incidence angle | |
| --- | --- | --- |
|  | 45° | 90° |
| invention(Example 3) | | |

What is claimed is:

1. Sintered ceramic material based on silicon nitride, silicon oxide, aluminum nitride, aluminum oxide or mixtures thereof, in which the densification during sintering takes place with an intergranular liquid phase, said material comprising a core and a surface zone with a gradual transition in at least one of composition and crystal structure between said core and said surface zone.

2. Sintered material according to claim 1, in which the surface zone is more than 100 μm thick and with a density of more than 98% of the theoretical density.

3. Sintered material according to claim 1, based on silicon nitride.

4. Sintered material according to claim 2, based on silicon nitride.

5. Method of producing a sintered material according to claim 1 comprising the step of sintering the ceramic material in a protective powder with a composition similar to that of the intergranular phase.

6. Method of producing a sintered material according to claim 5, wherein the surface zone is more than 100 μm thick and with a density of more than 98% of the theoretical density.

7. Method of producing a sintered material according to claim 5, wherein the material is based on silicon nitride.

8. Sintered ceramic material according to claim 1 in which the thickness of the surface zone is greater than 500 μm.

9. Sintered ceramic material according to claim 8 in which the thickness of the surface zone is from 0.8-2 mm.

10. Sintered ceramic material according to claim 1 in which the surface zone comprises beta-sialon ceramic material and the core comprises mixtures of alpha- and beta-sialon ceramic materials.

11. Sintered ceramic material according to claim 1 in which the surface zone comprises mixtures of alpha- and beta-sialon ceramic materials and the core comprises beta-sialon ceramic material.

12. Sintered ceramic material according to claim 1 wherein the sintered ceramic material includes fiber or whisker reinforcements.

13. Method of producing a sintered material according to claim 5 wherein sintering is performed in a nitrogen gas-containing atmosphere.

14. Method of producing a sintered material according to claim 13 wherein sintering is performed at nitrogen pressures above 1 atmosphere.

15. Method of producing a sintered material according to claim 14 wherein the nitrogen pressure is from 15 to 30 atmospheres.

16. Method of producing a sintered material according to claim 14 wherein sintering aids are included in the material to be sintered.

* * * * *